Figure 1:
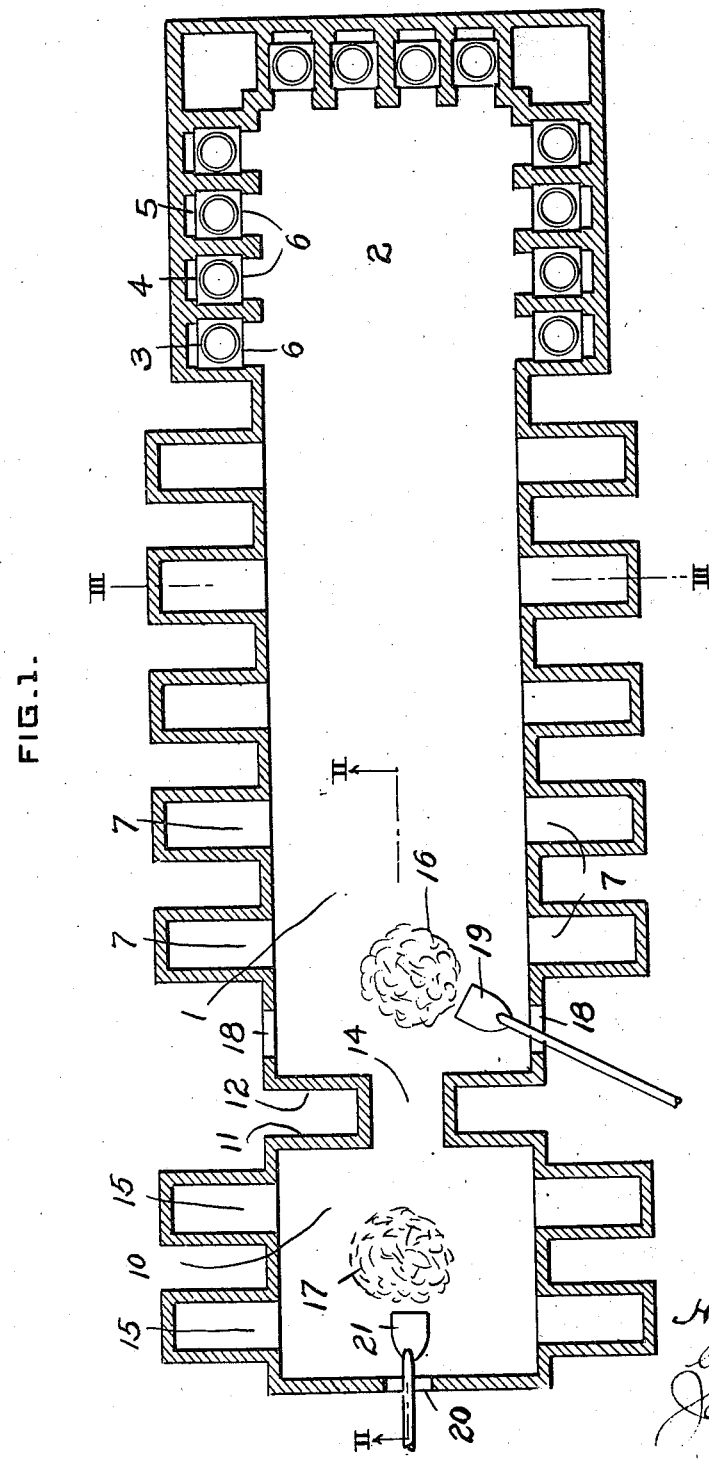

March 18, 1924.

H. G. SLINGLUFF

GLASS MELTING TANK

Filed Nov. 15, 1922

1,486,992

4 Sheets-Sheet 1

INVENTOR
H. G. Slingluff.
by
James C. Bradley
Atty.

March 18, 1924.
H. G. SLINGLUFF
GLASS MELTING TANK
Filed Nov. 15, 1922
1,486,992
4 Sheets-Sheet 2
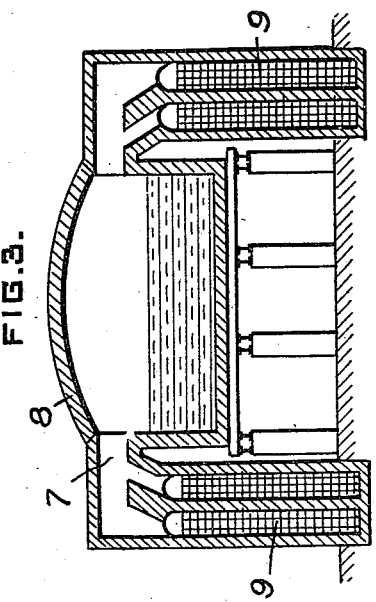
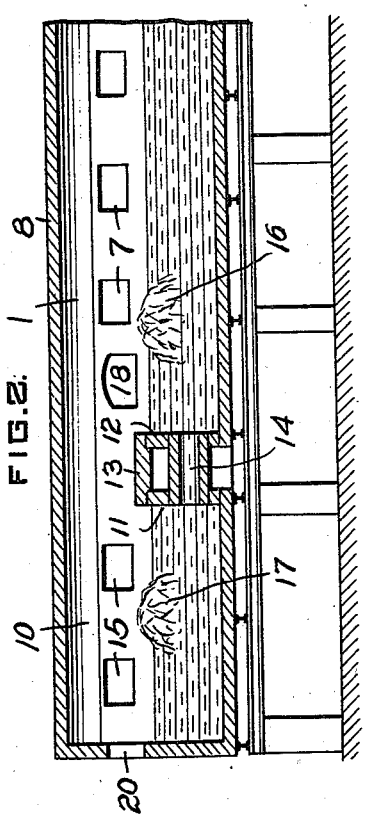
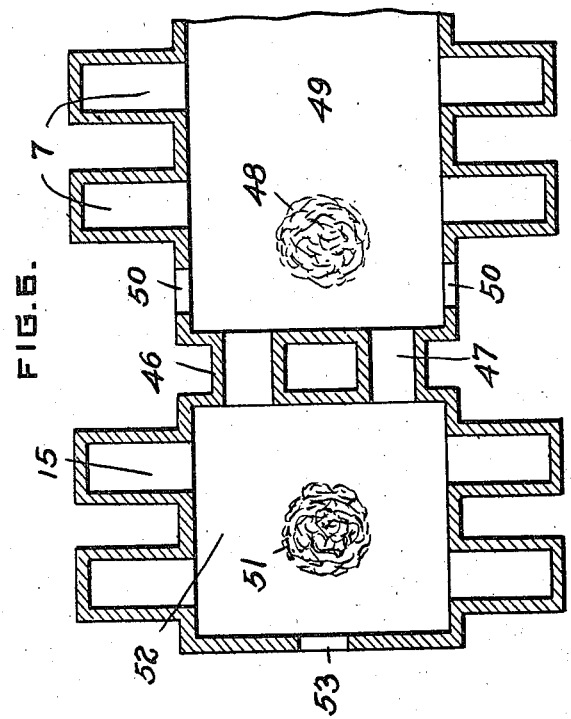
INVENTOR
H. G. Slingluff.

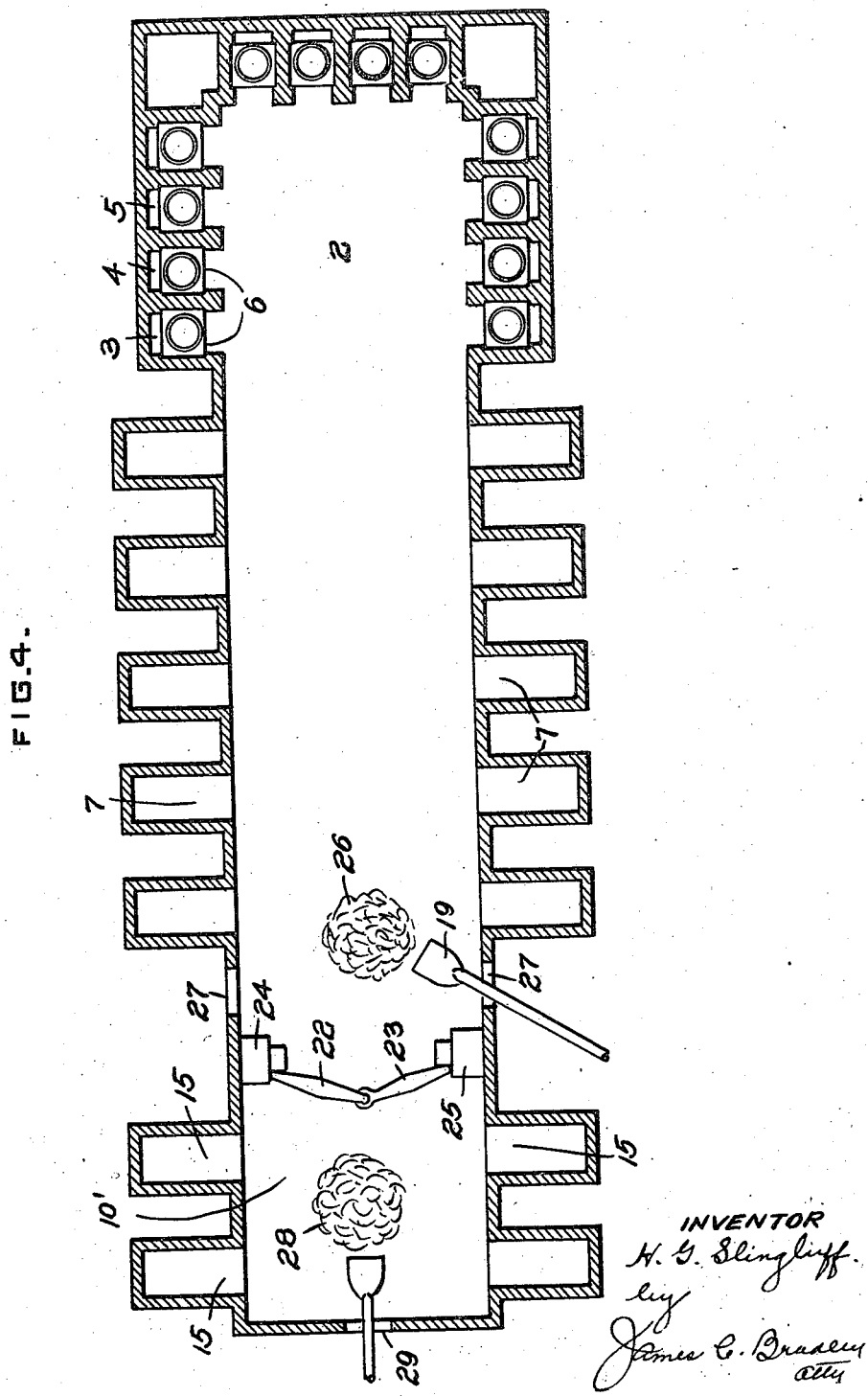

March 18, 1924.

H. G. SLINGLUFF

GLASS MELTING TANK

Filed Nov. 15, 1922

1,486,992

4 Sheets-Sheet 4

INVENTOR
H. G. Slingluff
by
James C. Bradley
Atty.

Patented Mar. 18, 1924.

1,486,992

UNITED STATES PATENT OFFICE.

HARRY G. SLINGLUFF, OF MOUNT VERNON, OHIO, ASSIGNOR TO PITTSBURGH PLATE GLASS COMPANY, A CORPORATION OF PENNSYLVANIA.

GLASS-MELTING TANK.

Application filed November 15, 1922. Serial No. 601,079.

*To all whom it may concern:*

Be it known that I, HARRY G. SLINGLUFF, a citizen of the United States, and a resident of Mount Vernon, in the county of Knox and State of Ohio, have made a new and useful invention in Improvements in Glass-Melting Tanks, of which the following is a specification.

The invention relates to regenerative glass melting tanks and has for its principal objects the provision of an improvement whereby the capacity of existing tanks may be largely increased by an addition of limited expense and cost and whereby new tanks may be constructed of relatively large capacity as compared with the cost of construction. Hitherto difficulty has been experienced in increasing the size and capacity of a melting tank beyond certain limits more or less recognized among manufacturers due to the difficulty in properly melting and fining the larger quantity of glass required corresponding to the increase in size.

My invention contemplates in its preferred practice, the maintenance of the dimensions of the main melting and fining tank at approximately the proportions corresponding to the accepted practice, and supplementing the capacity of the tank, as thus constructed, by means of a supplemental melting unit, which discharges molten glass into the melting end of the main tank. In this manner the capacity of the tank is increased since the speed of reducing the batch or cullet from a solid to a liquid is largely increased, this being the factor which in my opinion largely governs the capacity of the tank, since the batch when once reduced to molten form is readily fined in the fining section of the tank without any increase in the capacity of such fining section, the glass being properly fined even though the molten glass supplied at the melting end of the tank is very largely augmented.

The supplemental melting unit is preferably placed in line with the melting end of the main tank and is connected thereto by a suitable passage or passages so that two bodies of batch may be simultaneously reduced. This is the most convenient and economical means of suplying the molten batch to the melting end of the tank, but the glass might be ladled from a supplemental tank to the melting end of the main tank instead of being caused to flow thereto, the result in so far as the increasing of the capacity of the tank being the same in both cases, although the ladling operation would be a matter of additional expense. The supplemental tank might also occupy various positions with respect to the main melting tank aside from being placed directly in alignment therewith, although placing of the supplemental tank in the aligned position is the logical one and the one which is most readily applied except under unusual conditions. The addition of the supplemental tank gives an increase in capacity out of all proportion to the increased cost of the addition, so that the overhead incident to the cost of the entire installation is reduced by this expedient. The invention is also not limited to a single supplemental melting unit, but still other units may be added if it is desired to further multiply the capacity of the tank.

Figure 5:
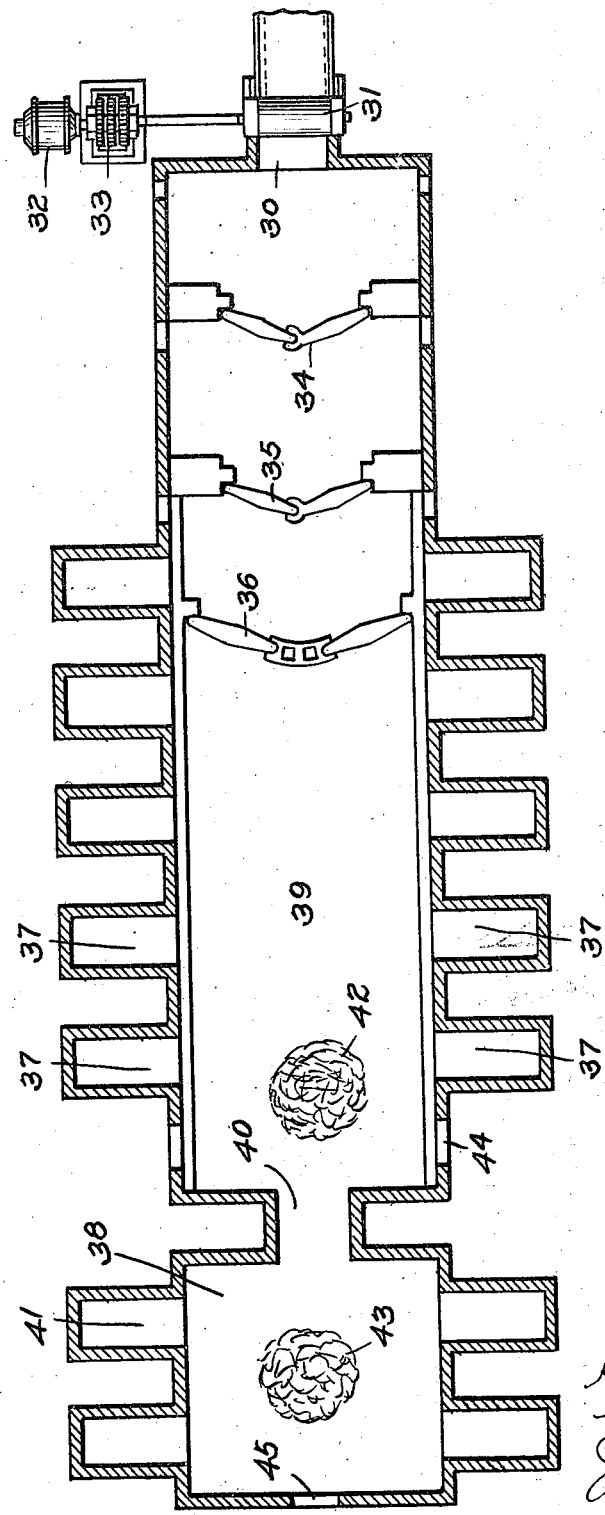

The invention is applicable to tanks for producing a number of different types of glass, but has one of its largest uses in connection with the manufacture of window glass, in which glass is ladled from the delivery end of the tank and subsequently drawn in cylinders, or in which the delivery end of the tank is provided with drawing apparatus whereby glass cylinders are drawn directly from the body of molten glass in the tank. A further large field of use is found in the manufacture of rolled glass in which the delivery end of the apparatus is arranged to form a continuous sheet or ribbon of glass which is subsequently carried through a leer. A tank of this character must necessarily be of very large capacity since the operation is continuous and the amount of glass withdrawn per unit of time is large. The drawings illustrate the tank as applied to the manufacture of the two kinds of glass above referred to, namely, in the manufacture of window glass and in the manufacture of rolled glass, but it will be understood that in so far as the delivery end of the tank is concerned the invention is of broad scope, since the purpose or form of the product as delivered from the tank is immaterial in so far as the present invention is concerned. Referring to the drawings:

Figure 1 is a horizontal section showing the tank in simple, diagrammatic form as it might be employed in the manufacture of window glass, the delivery end of the furnace being provided with suitable drawing kilns similar to those shown in my Patent No. 1,251,931; Fig. 2 is a vertical longitudinal section through the rear portion of the furnace on the line II—II of Fig. 1; Fig. 3 is a tranverse section on the line III—III of Fig. 1; Fig. 4 is a horizontal section similar to that of Fig. 1, but showing a modification in which floaters are employed for separating the main and supplemental sections of the tank; Fig. 5 is also a horizontal section like that of Fig. 1, but showing a modified form of delivery end such as that employed in connection with the making of rolled glass; and Fig. 6 is a partial horizontal view illustrating a modification of the Fig. 1 construction.

Referring to the construction of Fig. 1, 1 is the melting end of a regenerative glass tank and 2 is the discharge or withdrawing end of such tank provided with the extensions or forehearths 3, 4, 5, etc., of a construction similar to that indicated in my Patent No. 1,251,931, such extensions or forehearths being provided with suitable anchors and with top stones 6 to permit of the drawing of glass cylinders in a manner well known in the art.

The sets of ports 7 lead into the tank beneath the arch 8 (Fig. 3) and a mixture of gas and air from the regenerators 9 passes into the tank and is burned intermediate the arch and the surface of the body of glass in the tank. The direction of flow of air and gas is reversed at intervals, in a manner well known in connection with the use of regenerators with glass furnaces, there being nothing novel in the application of these regenerators to the tank as disclosed in the present application.

The novel feature in this construction of Fig. 1 is involved in the addition to the rear end of the tank 1 of the supplemental melting unit or tank 10. This supplemental tank is separated from the main tank by means of the walls 11 and 12 which extend up to a point above the level of the glass as indicated in Fig. 2, the space between the two walls at the top being closed by the cap stone or block 13. Communication between the two tanks is afforded by means of the passageway 14 which is located intermediate the bottoms of the tanks and the glass levels therein. This supplemental tank is heated by means of two sets of ports 15 which communicate with regenerators at the sides of the tank and through which gas and air are supplied to secure the heating of the tank in precisely the same manner that the regenerators and ports are employed in the main tank. The transverse section of Fig. 3 serves equally well to illustrate a section taken through the supplemental tank 10 and its regenerating means.

Batch is supplied to the melting end 1 of the main tank as indicated at 16 and also to the supplemental tank 10 as indicated at 17, so that two volumes of batch are constantly exposed to a reducing action. The batch 16 is preferably supplied through openings 18 in the side walls of the main tank, a shovel 19 being shown to illustrate one method of placing the batch in the tank, although it will be understood that this may be done in a number of ways. Similarly the batch 17 is supplied through the opening 20 at the rear end of the supplemental tank 10, a shovel 21 being shown to indicate one means for feeding the batch.

The use of the supplemental melting unit 10 greatly increases the capacity of the tank as substantially the same amount of batch can be melted in the supplemental tank as in the main tank, the batch in each case being exposed to the direct heating effect from two sets of ports. The subsequent fining action is brought about by the heat from the gases supplied through the three sets of ports at the forward end of the main tank, and the heat thus supplied will adequately fine all of the glass which can be properly melted and reduced at the rear end of the main tank and in the supplemental tank. It is, therefore, possible to largely increase the capacity of the main tank by the addition of the supplemental tank which is an addition relatively much less expensive than building a new tank entire and requires only a small amount of additional space for its installation at the rear end of the main tank. The molten glass from the supplemental tank as it is fed through the passage 14 not only does not interfere with the reducing of the batch 16 in the main furnace, but actually facilitates such reduction as the hot glass flowing beneath the batch 16 increases its speed of melting. The use of the two walls 11 and 12 instead of a single wall between the two tanks is advantageous as the air space thus provided keeps the clay constituting the walls cooler than if only a single wall were employed so that this clay work is more durable and the glass is maintained in better condition incident to the addition of a smaller amount of clay tending to form stone in the glass.

Fig. 4 illustrates a modification of the construction of Fig. 1, the walls 11 and 12 being replaced by a pair of floaters 22 and 23 supported from the abutments 24 and 25. These floaters are of clay with their upper edges lying above the surface of the glass and their lower edges extended down from 18 inches to 2 feet below the level of the glass. The construction of the furnace or tank forward of the batch 26 is the same as in the construction of Fig. 1 and the parts are similarly numbered. The batch 26 is supplied through the openings 27, a shovel or other suitable device being employed for this purpose. The supplemental portion 10' of the construction also corresponds throughout to the supplemental tank 10 of Fig. 1, the body of batch 28 being supplied through the opening 29 at the rear of the tank and being reduced by means of regenerators provided with the ports 15 as heretofore described. The floaters employed between the two sets of batch interrupt or retard the flow at the surface of the glass, so that the glass from the supplemental unit cannot pass to the main tank until it is reduced to a fluid state in which form it flows forward beneath the floaters into the rear end of the main tank.

Fig. 5 illustrates the construction as applied to a tank adapted to form a continuous ribbon of rolled sheet glass at its discharge end. The discharge end is provided with an outlet passage 30 leading between a pair of water cooled rolls 31 which are rotated from the motor 32 with the reducing gearing 33. The glass as it emerges from between the rolls 31 passes into a suitable leer (not shown), the details of this mechanism constituting no part of the present invention. To the rear of the discharge slot 30 are the sets of floaters 34, 35 and 36 and to the rear of the floaters 35 are five sets of opposing ports 37 connected to suitable regenerators as in the construction of Fig. 1. The supplemental tank 38 is connected to the rear end of the main tank 39 by means of the passage 40 and is heated from the two sets of ports 41. Two masses or bodies of batch 42 and 43 are reduced as in the construction of Fig. 1, the general construction of the tank to the rear of the floaters 35 being substantially indentical with that of the tank of Fig 1. The batch 42 is supplied through the openings 44 and the batch 43 through the opening 45.

Fig. 6 illustrates a modification of the method of connecting the supplemental unit with the main tank. This is accomplished by means of the two passages 46 and 47 instead of the single passage 14 of Fig. 1, such passages being located below the surface of the glass as in the cinstruction of Fig. 1, but being located at the sides of the tank instead of at the center. In other respects the construction is the same, the batch 48 being supplied to the rear end of the tank 49 through the openings 50 and the batch 51 being supplied to the supplemental tank 52 through the opening 53.

The apparatus throughout is shown in simple form and it will be understood is capable of considerable modifications without departing from the spirit of the invention which is of wide scope and contemplates broadly the addition of molten glass to the melting end of a tank furnace. The walls 11 and 12 and other clay work subjected to the corrosive and washing action of the glass may be protected by any of the means known in the art in order to reduce such action, such as by the use of suitable air cooling or circulating means, and any suitable batch feeding or ladling apparatus may be substituted for the means diagrammatically shown herein.

What I claim is:

1. The combination with a regenerative glass melting tank having a melting end and a discharge end, of means for supplying molten glass to said melting end of the tank.

2. The combination with a regenerative glass melting tank having a melting end and a discharge end, of a supplemental melting unit adjoining said melting end with a passage leading therefrom to said melting end.

3. The combnation with a regenerative glass melting tank having a melting end and a discharge end, of a supplemental regenerative melting unit in alignment with said melting end with a passage leading therefrom to said melting end.

4. In a glass melting tank having regenerative heating means and a series of opposing ports arranged along the length of the tank, means whereby batch may be fed into the tank at separated points along its length at the melting end thereof, and refractory flow retarding means across the tank intermediate the points of feed and extending below the surface of the glass.

5. In a glass melting tank having regenerative heating means and a series of opposing ports arranged along the length of the tank, means whereby batch may be fed into the tank at separated points along its length at the melting end thereof, and a wall extending transversely of the tank intermediate the points of feed and having a passage therethrough below the level of the glass.

6. In a glass melting tank having regenerative heating means and a series of opposing ports arranged along the length of the tank, means whereby batch may be fed into the tank at separated points along its length at the melting end thereof, and a wall extending transversely of the tank intermediate the points of feed and having a passage therethrough below the level of the glass, the said wall being provided with an air space intermediate its front and rear faces.

7. In a glass meltng tank having regenerative heating means and a series of opposing ports arranged along the length of the tank, means whereby batch may be fed into the tank at separated points along its length at the melting end thereof, and a wall extending transversely of the tank intermediate the points of feed and having a passage therethrough below the level of the glass, the said wall extending from the bottom of the tank upward above the surface of the glass.

8. In a glass melting tank having regenerative heating means and a series of opposing ports arranged along the length of the tank, means whereby batch may be fed into the tank at separated points along its length at the melting end thereof, and a wall extending transversely of the tank intermediate the points of feed and having a passage therethrough below the level of the glass, the said wall extending from the bottom of the tank upward above the surface of the glass, and being in two parallel sections with an air space therebetween.

9. The process of operating a regenerative glass melting furnace which consists in feeding batch into the melting end of the tank at separated points along the length thereof and interrupting the flow in the tank intermediate the two points of feed.

10. The process of operating a regenerative glass melting furnace which consists in supplying batch to the melting end of such furnace and also feeding molten glass into such melting end to the rear of said batch.

11. The process of operating a regenerative glass melting furnace which consists in supplying batch to the melting end of such furnace, independently melting a quantity of glass, and flowing it into the melting end of the tank.

12. The method of increasing the normal capacity of a continuous tank glass furnace which consists in melting batch in the melting end of the furnace and coincidently supplying molten glass to such melting end in such manner that it becomes a part of the said melting batch and forms therewith a homogeneous body of glass that is subsequently fined in the fining end of the tank.

In testimony whereof, I have hereunto subscribed my name this 6th day of November, 1922.

HARRY G. SLINGLUFF.